(12) United States Patent
Kitahara et al.

(10) Patent No.: US 9,906,803 B2
(45) Date of Patent: Feb. 27, 2018

(54) QUANTIZATION CONTROL APPARATUS AND METHOD, AND QUANTIZATION CONTROL PROGRAM

(75) Inventors: Masaki Kitahara, Yokosuka (JP); Atsushi Shimizu, Yokosuka (JP); Naoki Ono, Yokosuka (JP); Seisuke Kyochi, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 112 days.

(21) Appl. No.: 13/978,099

(22) PCT Filed: Mar. 5, 2012

(86) PCT No.: PCT/JP2012/055564
§ 371 (c)(1),
(2), (4) Date: Jul. 2, 2013

(87) PCT Pub. No.: WO2012/121211
PCT Pub. Date: Sep. 13, 2012

(65) Prior Publication Data
US 2013/0343453 A1 Dec. 26, 2013

(30) Foreign Application Priority Data
Mar. 10, 2011 (JP) .................................. 2011-052872

(51) Int. Cl.
*H04N 19/14* (2014.01)
*H04N 19/124* (2014.01)
(Continued)

(52) U.S. Cl.
CPC ......... *H04N 19/196* (2014.11); *H04N 19/124* (2014.11); *H04N 19/14* (2014.11); *H04N 19/593* (2014.11)

(58) Field of Classification Search
CPC .. H04N 19/0009; H04N 19/124; H04N 19/14; H04N 19/196; H04N 19/593
(Continued)

(56) References Cited

U.S. PATENT DOCUMENTS

| 5,832,234 A | * | 11/1998 | Iverson | H04N 19/503 375/240.11 |
| 6,023,296 A | * | 2/2000 | Lee | H04N 19/172 375/240.05 |

(Continued)

FOREIGN PATENT DOCUMENTS

| CA | 2 667 512 A1 | 5/2008 |
| EP | 1 465 430 A2 | 10/2004 |

(Continued)

OTHER PUBLICATIONS

EPO Examination of Application No. 12754501 (Published as EP 2648409 A1), dated Mar. 8, 2015, pp. 1-6.*

(Continued)

*Primary Examiner* — Christopher S Kelley
*Assistant Examiner* — Kathleen Walsh
(74) *Attorney, Agent, or Firm* — Harness, Dickey & Pierce, P.L.C.

(57) ABSTRACT

A quantization control apparatus provided in a video encoding apparatus which utilizes intra slices. The quantization control apparatus includes a similarity computation device that computes similarity between an intra slice region of an encoding target picture and an intra slice region of each of previously-encoded pictures, where the similarity is an index determined such that the closer the images of the two different intra slices, the higher the similarity; a picture selection device that selects a picture having the highest similarity from among the previously-encoded pictures, based on the similarity computed by the similarity compu- (Continued)

tation device; and a quantization step determination device that determines a quantization step used for encoding the encoding target picture, based on encoding information for the picture selected by the picture selection device.

13 Claims, 9 Drawing Sheets (51) Int. Cl.
*H04N 19/196* (2014.01)
*H04N 19/593* (2014.01)

(58) Field of Classification Search
USPC .................. 375/240.03, 240.04, 240.05
See application file for complete search history.

(56) References Cited

U.S. PATENT DOCUMENTS

| | | | | |
|---|---|---|---|---|
| 7,251,275 | B2* | 7/2007 | Wu | H04N 21/23608 375/240.03 |
| 7,653,130 | B2* | 1/2010 | Joyce | H04N 19/139 375/240.07 |
| 7,936,818 | B2* | 5/2011 | Jayant | H04N 19/00 375/240.05 |
| 8,036,270 | B2* | 10/2011 | Zhao | H04N 19/172 348/447 |
| 8,335,388 | B2* | 12/2012 | Satou | H04N 19/105 375/240.13 |
| 8,520,730 | B2* | 8/2013 | Kadono | H04N 19/61 375/240.13 |
| 8,537,896 | B2* | 9/2013 | Tanaka | H04N 19/61 375/240.16 |
| 8,634,469 | B2* | 1/2014 | Lu | H04N 19/56 348/699 |
| 8,649,431 | B2* | 2/2014 | Cheon | H04N 19/176 375/240.03 |
| 8,948,255 | B2* | 2/2015 | Kadono | H04N 19/176 375/240.03 |
| 2003/0039308 | A1* | 2/2003 | Wu | H04N 19/503 375/240.12 |
| 2003/0128756 | A1 | 7/2003 | Oktem | |
| 2005/0047504 | A1* | 3/2005 | Sung | H04N 19/105 375/240.2 |
| 2005/0152450 | A1 | 7/2005 | Ueno et al. | |
| 2006/0093032 | A1 | 5/2006 | Shindo | |
| 2006/0182174 | A1* | 8/2006 | Kuo | H04N 19/176 375/240.03 |
| 2006/0209952 | A1* | 9/2006 | Tanizawa | H04N 19/176 375/240.03 |
| 2006/0245496 | A1* | 11/2006 | Chen | H04N 19/176 375/240.16 |
| 2008/0025397 | A1* | 1/2008 | Zhao | H04N 19/172 375/240.13 |
| 2008/0159385 | A1* | 7/2008 | Joyce | H04N 19/139 375/240.03 |
| 2008/0170793 | A1* | 7/2008 | Yamada | H04N 21/236 382/232 |
| 2008/0304562 | A1* | 12/2008 | Chang | H04N 19/159 375/240.03 |
| 2008/0304564 | A1* | 12/2008 | Kim | H04N 19/197 375/240.03 |
| 2009/0086816 | A1* | 4/2009 | Leontaris | H04N 19/176 375/240.03 |
| 2009/0274211 | A1* | 11/2009 | Zhou | H04N 19/176 375/240.12 |
| 2010/0046614 | A1* | 2/2010 | Choi | H04N 19/176 375/240.02 |
| 2010/0118937 | A1* | 5/2010 | Shimizu | H04N 19/147 375/240.03 |
| 2011/0007800 | A1* | 1/2011 | Zheng | H04N 19/105 375/240.12 |
| 2011/0026597 | A1* | 2/2011 | Tanaka | H04N 19/61 375/240.16 |
| 2011/0122943 | A1* | 5/2011 | Kadono | H04N 19/176 375/240.03 |
| 2011/0286520 | A1* | 11/2011 | Xu | H04N 19/176 375/240.12 |
| 2012/0213279 | A1* | 8/2012 | Lu | H04N 19/176 375/240.12 |
| 2012/0281752 | A1* | 11/2012 | Zheng | H04N 19/105 375/240.03 |

FOREIGN PATENT DOCUMENTS

| | | | |
|---|---|---|---|
| JP | 07-095564 A | | 4/1995 |
| JP | 07095564 A | * | 4/1995 |
| JP | 2001-028753 A | | 1/2001 |
| JP | 2004-274236 A | | 9/2004 |
| JP | 2006-135557 A | | 5/2006 |
| JP | 2009-055262 A | | 3/2009 |
| JP | 2010-035025 A | | 2/2010 |
| JP | 2010035025 A | * | 2/2010 |
| RU | 2 125 765 C1 | | 1/1999 |
| RU | 2 340 115 C1 | | 11/2008 |
| TW | 441198 B | | 6/2001 |
| TW | I221388 B | | 9/2004 |
| TW | I225363 B | | 12/2004 |
| TW | 200803503 A | | 1/2008 |
| WO | 03/061265 A2 | | 7/2003 |
| WO | 2006/099229 A1 | | 9/2006 |
| WO | WO 2006099229 A1 | * | 9/2006 ........... H04N 19/176 |
| WO | 2009/105732 A1 | | 8/2009 |
| WO | WO 2010035505 A1 | * | 4/2010 ........... H04N 19/176 |

OTHER PUBLICATIONS

Sakaida et al., "Adaptive Quantization Control for Reducing Flicker of AVC/H.264 Intra Frames," NKH Science and Technical Research Laboratories, 2004, pp. 116-119.*
Office Action, Canadian Patent Application No. 2,824,164, dated Feb. 19, 2015.
Office Action, Taiwanese Patent Application No. 101107427, dated Feb. 24, 2015.
Search Report, European Patent Application No. 12754501.0, dated Apr. 24, 2014.
International Search Report (English and Japanese) and Written Opinion of the ISA (Japanese) for PCT/JP2012/055564, ISA/JP, dated Jun. 5, 2012.
Decision on Grant, Russian Patent Application No. 2013135712, Aug. 26, 2015.
Office Action, Russian Patent Application No. 2013135712, dated Jan. 21, 2015.

* cited by examiner

QUANTIZATION CONTROL APPARATUS AND METHOD, AND QUANTIZATION CONTROL PROGRAM

TECHNICAL FIELD

The present invention relates to a quantization control apparatus, a quantization control method, and a quantization control program, which are used in video encoding that realizes low delay by employing intra slices.

Priority is claimed on Japanese Patent Application No. 2011-052872, filed Mar. 10, 2011, the contents of which are incorporated herein by reference.

BACKGROUND ART

In order to perform bidirectional video communication such as videotelephony, delay should be low. This "delay" indicates a time measured from when a video sending side of a system acquires a picture using a camera or the like, to when a video decoding side of the system displays this acquired picture.

In addition, a "picture" denotes a frame or a field in input video.

To such application, a video coding technique is applied so as to reduce the bandwidth frequency required for video transmission. Among the total delay time, video coding technique mainly affects (i) time required for encoding executed on the video sending side, (ii) time required for buffering of encoded data on the video receiving side, and (iii) time required for decoding of the encoded data on the video receiving side. In order to reduce the delay time for the encoding/decoding processes, speed for these processes should be increased. Additionally, in order to reduce the encoded data buffering time on the video receiving side, employment of intra slices (explained later) and a quantization control technique suitable therefor is effective.

In general video coding, an intra-type picture is inserted regularly for a purpose of refreshing. However, in comparison with an inter-type picture, the intra-type picture has a very large amount of code, which requires a long buffering time for the encoded data on the video receiving side, thereby the delay time is increased.

Instead of using the intra picture, the video encoding that employs intra slices realizes refreshing by moving, in each picture, a band in a longitudinal or lateral direction, instead of using intra pictures, where the band forcibly subjects all macroblocks in the band to intra encoding. In this process, inter encoding may be performed in each region (in the picture) other than the intra slices, where such a region will be called a "non intra slice region".

According to such a method, the amount of code generated for each picture can almost be constant, thereby the buffering time can be reduced.

When arranging the above-described band in a longitudinal direction, it may not be called the "intra slice" (and may be called an "intra column"). However, for convenience of explanation, the present specification uses "intra slice" for either case of moving the band in a longitudinal or lateral direction.

Figure 9:
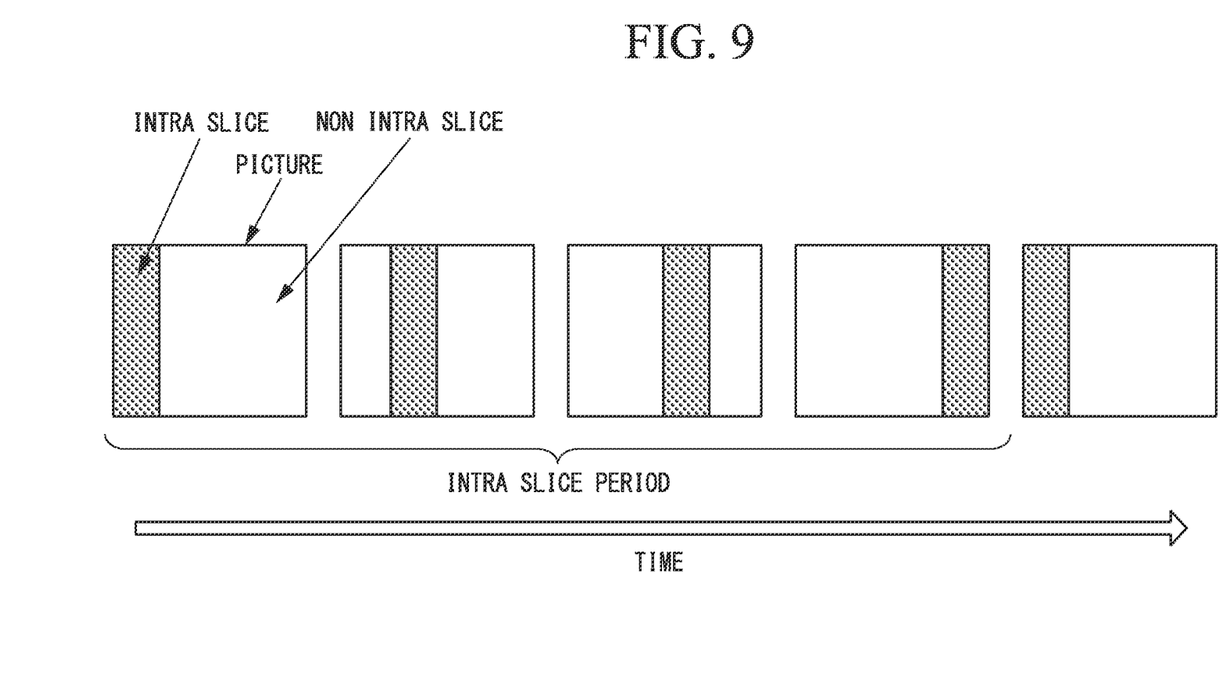
FIG. 9 is a diagram showing a concept of a case that provides an intra slice arranged in a longitudinal direction.

FIG. 9 is a diagram showing a concept of a case that provides an intra slice arranged in a longitudinal direction. In the shown example, the intra slice moves from the left end to the right end in the relevant picture, where time for the number of pictures among which the position of the intra slice moves in one period (i.e., the number of pictures for which the intra slice moves from the left end to the right end for the pictures) is called an "intra slice period".

when the video receiving side cannot accurately generate a decoded picture due to packet loss or the like, if the intra slice moves from the left side to the right side of the picture after such inaccurate decoding, then accurate decoded images are obtained after that (i.e., refreshing has been performed). That is, after the packet loss or the like occurs, refreshing has been completed within twice the intra slice period.

When using the intra slice, the amount of generated code considerably differ between the intra slice region and the non intra slice region. Therefore, a quantization control method that can allocate an appropriate amount code to each region is required.

Patent-Document 1 discloses a technique that implements such a technique.

In the technique disclosed in Patent-Document 1, (i) an amount of code generated for an intra slice region in a picture immediately before an encoding target picture and (ii) an average quantization step (these items (i) and (ii) will be collectively called "encoding information") are used to compute complexity index $X_i$ for the relevant region.

Similarly, encoding information for a non intra slice region in the picture immediately before the encoding target picture is used to compute complexity index $X_p$ for the relevant region.

Based on $X_i$ and $X_p$, a target amount T of code for the encoding target picture is divided into a target amount $T_i$ of code for the intra slice region and a target amount $T_p$ of code for the non intra slice region. Then, based on $T_i$ and $T_p$, the quantization step for each macroblock in the picture is determined.

The above method causes the following problems.

Generally, the shorter the intra slice period (i.e., the smaller the size of the intra slice region in each picture), the lower the image quality. Therefore, in most cases, the intra slice period is set to 0.5 sec or longer. When the intra slice period is short, the area of the intra slice becomes considerably small. For example, if the intra slice period is 0.5 sec and 30 pictures are present in each second, then the area of the intra slice region is one-fourteenth of the area of the non intra slice region.

Therefore, the property of video may considerably differ between the intra slice in an encoding target picture and the intra slice in a picture immediately before the encoding target picture. In such a case, the complexity index $X_i$ is not accurate, which degrades the image quality.

In such circumstances, it can be easily anticipated to use encoding information for the intra slice in an earlier picture than the encoding target picture by one intra slice period (i.e., a picture that has the same intra slice position (on the picture) as that of the encoding target picture). However, since such an earlier picture is temporally far away from the encoding target picture, if an object has moved, the property of the intra slice has considerably changed, which also causes degradation in the image quality.

In order to solve the above problem, a technique disclosed in Patent-Document 2 may be combined with the technique of Patent-Document 1.

Although the technique of Patent-Document 2 is not applied to a case using the intra slice, it corrects a complexity index of the encoding target picture when computing the complexity index by using encoding information of a picture immediately before the encoding target picture, where the correction is performed based on activity measures of the encoding target picture and the picture immediately before.

The activity measure represents a characteristic feature of each image in a manner such that the finer (i.e., including edge portions) the texture of each target block, the larger the activity measure. The relevant technique is effective when the property slightly differs between the encoding target picture and the picture immediately before, for example, during a fade-in or fade-out period.

If the technique of Patent-Document 2 is applied to the complexity index computation for the intra slice in the technique of Patent-Document 1, image quality can be improved when the property of the intra slice differs between the encoding target picture and an earlier picture than the encoding target picture by one intra slice period.

PRIOR ART DOCUMENT

Patent Document

Patent Document 1: Japanese Unexamined Patent Application, First Publication No. H07-095564.
Patent Document 2: Japanese Unexamined Patent Application, First Publication No. 2009-055262.

DISCLOSURE OF INVENTION

Problem to be Solved by the Invention

However, when applying the technique of Patent-Document 2 to the technique of Patent-Document 1, if the intra slice of the encoding target picture has a texture that considerably differs from that of an intra slice used for computing the complexity index (e.g., different objects have been captured in the respective pictures), the accuracy of the complexity index may be still low, which degrades the image quality.

Such a phenomenon often occurs in an encoding method using intra prediction, such as H.264. In H.264, prediction is performed using decoded neighbor pixels of an encoding target block together with switching between a plurality of prediction models such as multidirectional extrapolation or mean value prediction. That is, in a processing target picture, highly accurate prediction can be performed in a region that has a texture which coincides with the relevant prediction model, thereby the amount of generated code is small.

By contrast, in a region that has a texture which does not coincide with the prediction model, a large amount of code is generated even if the activity is distinctively small in comparison with the region that hat has a texture which coincides with the prediction model.

Therefore, when applying the technique of Patent-Document 2 to the technique of Patent-Document 1, if the activity of the intra slice in the encoding target picture is distinctively small in comparison with the activity of the intra slice in the picture immediately before the encoding target picture, then the complexity index for the encoding target picture is corrected to be a smaller value. However, when the texture of the intra slice in the encoding target picture does not coincide with the prediction model for the intra prediction, correction of the complexity index to a smaller value causes a degradation in the image quality.

In light of the above circumstances, an object of the present invention is to provide a quantization control apparatus, a quantization control method, and a quantization control program in video encoding, which implement low delay by utilizing the intra slices.

Means for Solving the Problem

The present invention provides a quantization control apparatus provided in a video encoding apparatus which utilizes intra slices, the quantization control apparatus comprising:
a similarity computation device that computes similarity between an intra slice region of an encoding target picture and an intra slice region of each of previously-encoded pictures, where the similarity is an index determined such that the closer the images of the two different intra slices, the higher the similarity;
a picture selection device that selects a picture having the highest similarity from among the previously-encoded pictures, based on the similarity computed by the similarity computation device; and
a quantization step determination device that determines a quantization step used for encoding the encoding target picture, based on encoding information for the picture selected by the picture selection device.

In a preferable example, the quantization control apparatus further comprises a threshold determination device that determines whether or not the similarity of the picture selected by the picture selection device is higher than a predetermined threshold,
wherein according to a result of the determination performed by the threshold determination device:
if the similarity is higher than the predetermined threshold the quantization step determination device executes the above determination of the quantization step used for the relevant encoding; and
if the similarity is lower than or equal to the predetermined threshold, the quantization step determination device determines the quantization step used for encoding the encoding target picture based on a predetermined initial value, without using the selected picture.

Typically, the similarity computation device that computes the similarity based on a difference absolute value for a total of activities for respective blocks of each intra slice.

In another preferable example, among the previously-encoded pictures, those which each have an intra slice whose position on an image plane is relatively close to that of the intra slice of the encoding target picture are subjected to the similarity computation by the similarity computation device.

The present invention also provides a quantization control method of controlling quantization in a quantization control apparatus provided in a video encoding apparatus which utilizes intra slices, the quantization control method comprising:
a similarity computation step that computes similarity between an intra slice region of an encoding target picture and an intra slice region of each of previously-encoded pictures, where the similarity is an index determined such that the closer the images of the two different intra slices, the higher the similarity;
a picture selection step that selects a picture having the highest similarity from among the previously-encoded pictures, based on the similarity computed by the similarity computation step; and
a quantization step determination step that determines a quantization step used for encoding the encoding target picture, based on encoding information for the picture selected by the picture selection step.

In a preferable example, the quantization control method further comprises a threshold determination step that determines whether or not the similarity of the picture selected by the picture selection step is higher than a predetermined threshold, wherein according to a result of the determination performed by the threshold determination step:

if the similarity is higher than the predetermined threshold the quantization step determination step executes the above determination of the quantization step used for the relevant encoding; and if the similarity is lower than or equal to the predetermined threshold, the quantization step determination step determines the quantization step used for encoding the encoding target picture based on a predetermined initial value, without using the selected picture.

Typically, the similarity computation step that computes the similarity based on a difference absolute value for a total of activities for respective blocks of each intra slice.

In another preferable example, among the previously-encoded pictures, those which each have an intra slice whose position on an image plane is relatively close to that of the intra slice of the encoding target picture are subjected to the similarity computation by the similarity computation step.

The present invention also provides a quantization control program of making a computer, that is provided at a video encoding apparatus which utilizes intra slices, execute a quantization control operation, the operation including:

a similarity computation step that computes similarity between an intra slice region of an encoding target picture and an intra slice region of each of previously-encoded pictures, where the similarity is an index determined such that the closer the images of the two different intra slices, the higher the similarity;

a picture selection step that selects a picture having the highest similarity from among the previously-encoded pictures, based on the similarity computed by the similarity computation step; and a quantization step determination step that determines a quantization step used for encoding the encoding target picture, based on encoding information for the picture selected by the picture selection step.

Effect of the Invention

In comparison with conventional techniques, the present invention has a distinctive feature such that computation of a complexity index for an intra slice of an encoding target picture can utilize a previously-encoded intra slice whose property is akin to that of the intra slice of the encoding target picture, thereby the image quality is improved.

MODE FOR CARRYING OUT THE INVENTION

First Embodiment

Below, a video encoding apparatus in accordance with a first embodiment of the present invention will be explained with reference to the drawings.

Figure 1:
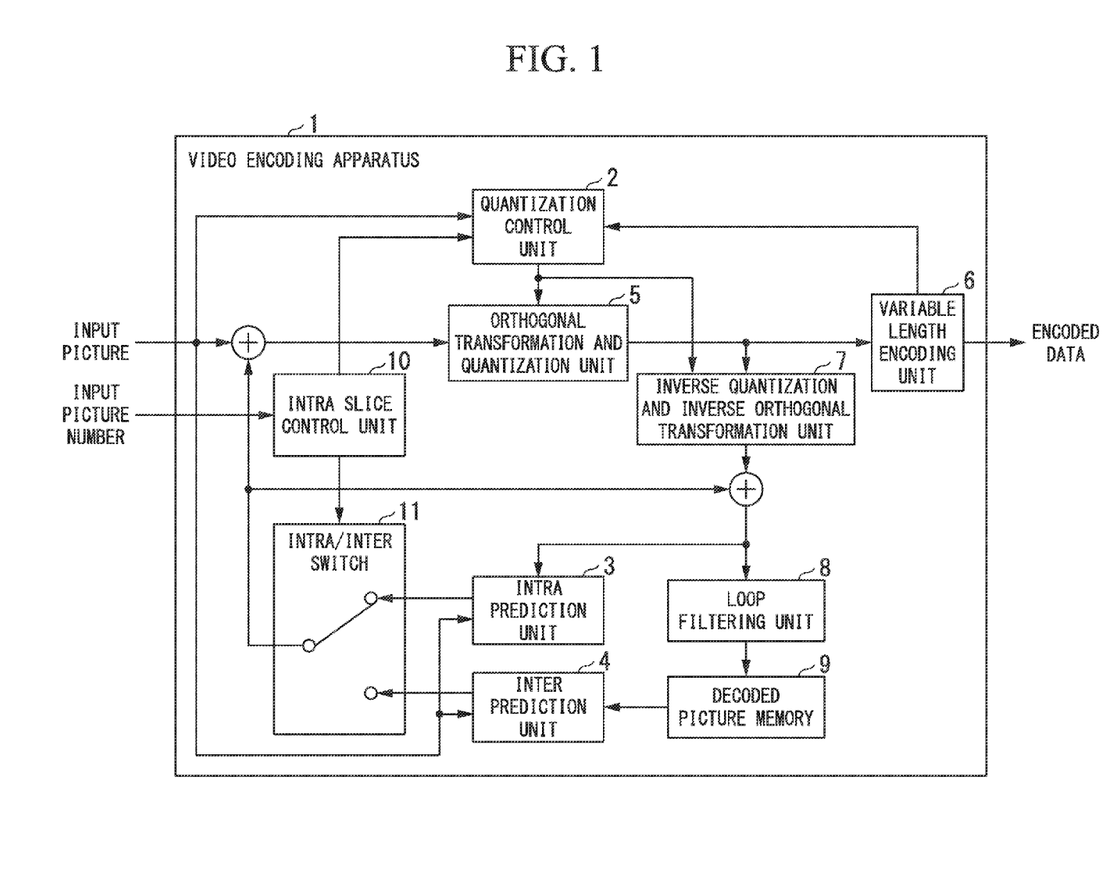
FIG. 1 is a block diagram showing the structure of a video encoding apparatus according to a first embodiment of the present invention.

FIG. 1 is a block diagram showing the structure of the present embodiment. The video encoding apparatus 1 shown in FIG. 1 has a structure that generates encoded data based on H.264, and outputs encoded data by receiving an input picture and an input picture number.

In the following explanation of the structure of the video encoding apparatus 1 with reference to FIG. 1, explanations about known functions or structures that any video encoding apparatus based on H.264 have are omitted as far as they do not directly relate to the explanation about the present invention.

In the video encoding apparatus 1 based on H.264 of the present embodiment, a quantization control unit 2 has a distinctive feature in comparison with a corresponding known structure.

Figure 2:
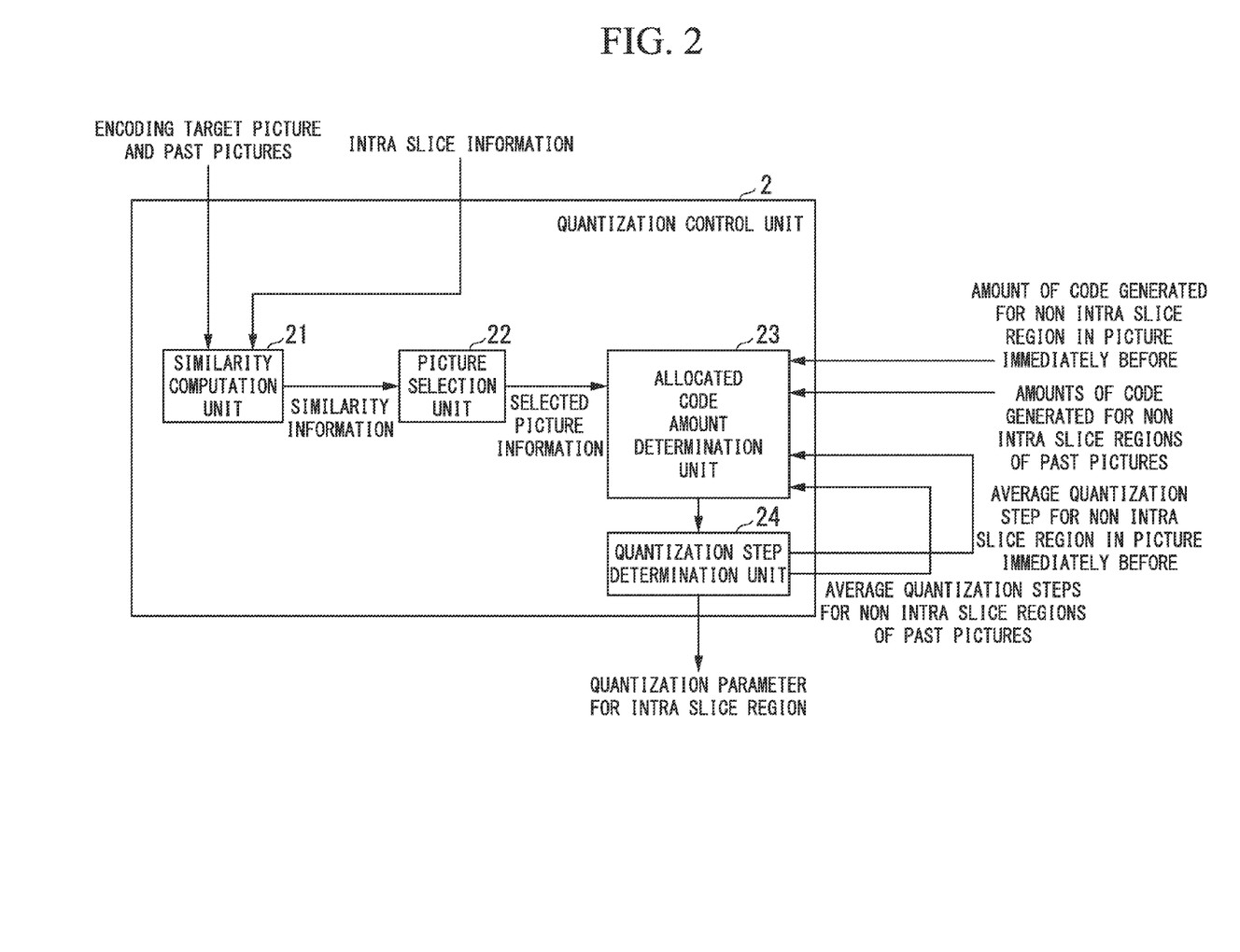
FIG. 2 is a block diagram showing the structure of a quantization control unit 2 in FIG. 1.

FIG. 2 shows the structure of the quantization control unit 2 in FIG. 1. The quantization control unit 2 of the present embodiment has a similarity computation unit 21, a picture selection unit 22, an allocated code amount determination unit 23, and a quantization step determination unit 24.

Below, referring to FIG. 1, a basic operation of the video encoding apparatus 1 in FIG. 1 will be explained.

Since the video encoding apparatus 1 generates encoded data based on H.264, many processes are each performed on a block basis.

For each encoding target block in an input picture, a difference from a predicted image block, that is output from an intra prediction unit 3 or an inter prediction unit 4, is computed. A difference image block formed by the computed difference is input into an orthogonal transformation and quantization unit 5, which subjects the difference image block to orthogonal transformation, and quantizes orthogonal transformation coefficients. Obtained quantized values of the orthogonal transformation coefficients are subjected, by a variable length encoding unit 6, to variable length encoding.

The quantized orthogonal transformation coefficients are also input into an inverse quantization and inverse orthogonal transformation unit 7, which subjects the quantized orthogonal transformation coefficients to inverse quantization and also subjects the inverse-quantized transformation coefficients to inverse orthogonal transformation. The quantization and the inverse quantization are performed using the quantization step (value), that is determined for each block and output from the quantization control unit 2. The operation of the quantization control will be explained later.

The inverse-orthogonal-transformed block is input into the intra prediction unit 3 so as to be used in intra prediction of another block. The intra prediction unit 3 subjects the encoding target block in the input picture to intra prediction using pixels in the block that is output from the inverse quantization and inverse orthogonal transformation unit 7.

The block output from the inverse quantization and inverse orthogonal transformation unit 7 is also input into a loop filtering unit 8. When receiving blocks of one picture, the loop filtering unit 8 subjects the blocks to a loop filtering operation (i.e., filtering operation within an encoding loop). Such a picture to which the loop filtering operation has been applied equals a decoded picture obtained on the decoding side. The decoded picture obtained here is stored in a decoded picture memory 9.

The inter prediction unit 4 sets the decoded picture stored in the decoded picture memory 9 to a reference image in the inter prediction of the encoding target block in the input picture.

An intra slice control unit 10 determines at which position an intra slice is inserted and what size the width of the intra slice is (i.e., what blocks of the picture are included in the intra slice).

Since the position of the intra slice shifts step by step accompanied with progression of the input pictures, an input picture number that indicates the input order of the input pictures is used. An intra/inter switch 11 is informed of whether or not the encoding target block is included in the intra slice.

If the encoding target block is included in the intra slice, the intra/inter switch 11 always chooses the intra prediction. Instead, if the encoding target block is not included in the intra slice, the intra/inter switch 11 always chooses the inter prediction.

When the encoding target block is not included in the intra slice, the switching between the intra prediction and the inter prediction may be performed in accordance with prediction efficiency. However, for convenience of the following explanations, the inter prediction is always chosen here.

Next, referring to FIG. 3, operation of the quantization control unit 2 shown in FIG. 2 will be explained. More specifically, an operation of determining the quantization step so as to encode a picture will be explained.

Figure 4:
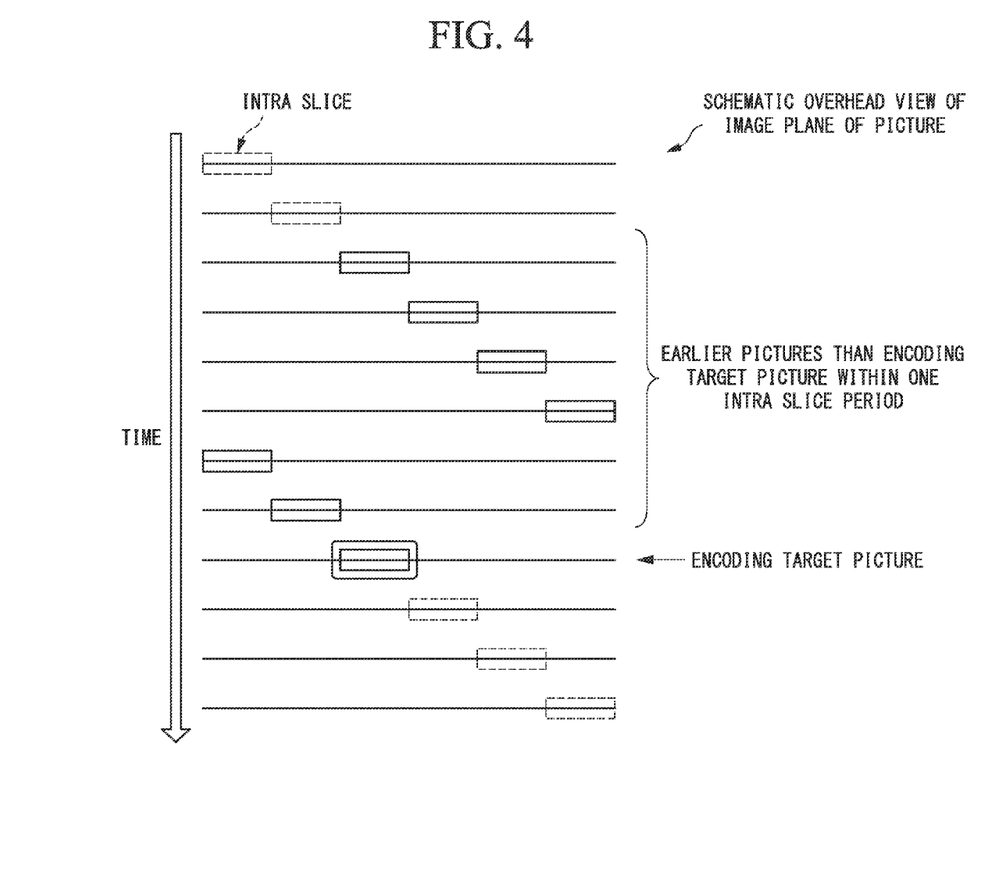
FIG. 4 is a diagram that shows an example of the intra slice insertion utilized in the first embodiment.

In addition, FIG. 4 shows an example of the intra slice insertion utilized in the present embodiment. The intra slice period is formed by six pictures, and the intra slice in each picture has the same width. In the encoding, all pictures except for the head picture are each encoded as a "P picture". That is, unlike in the case of including B pictures, encoding is executed in the order of inputting pictures.

In FIG. 2, the quantization control unit 2 receives an encoding target picture and a plurality of previously-encoded pictures (which are not decoded images but original images). In the present embodiment, previously-encoded pictures within one intra slice period (i.e., six pictures) are received, which are input into the similarity computation unit 21. The similarity computation unit 21 also receives intra slice information that designates at which position the intra slice is present in each picture.

By utilizing the received data, the similarity computation unit 21 computes similarity $C(i)$, where $i=0$ to $5$ ($i$ is an index for the previously-encoded pictures), between the intra slice of the encoding target picture and the intra slice of each previously-encoded picture (see step S1).

The similarity is an index value that indicates a degree of similarity between images of two different intra slice regions. The similarity may utilize the sum of absolute differences (called "SAD" below), where each difference is between corresponding pixel values (of the compared intra slices) which have the same relative coordinates. In this case, the smaller the value of $C(i)$, the closer the two intra slices are to each other.

Next, the picture selection unit 22 receives the similarity $C(i)$, where $i=0$ to $5$, between the intra slice of the encoding target picture and the intra slice of each previously-encoded picture.

Based on $C(i)$, the picture selection unit 22 determines a previously-encoded picture "i_select" that has the highest similarity for the intra slice (see step S2). Specifically, $C(i\_select)$ that has the smallest SAD is obtained. Then, the previously-encoded picture i_select is determined to be a selected picture, and informs the allocated code amount determination unit 23 of the index value "i_select" (selected picture information) of the selected picture.

Next, the allocated code amount determination unit 23 computes complexity indexes for the intra slice region and the non intra slice region.

The complexity index Xp for the non ultra slice region is computed by a known method. Here, it is computed utilizing encoding information (an amount of generated code and an average quantization step) for the non intra slice region of a picture immediately before (see step S3). More specifically, Xp is computed by "$Xp=Gp \times Qp\_ave$", where Gp denotes the amount of code generated for the non intra slice region of the picture immediately before, and Qp_ave denotes the average quantization step.

Next, the complexity index Xi for the intra slice region is computed (see step S4). Specifically, Xi is computed utilizing the encoding information (the amount of generated code and the average quantization step) for the intra slice region of the previously-encoded picture i_select (the selected picture) selected by the picture selection unit 22. The allocated code amount determination unit 23 has received encoding information for the intra slice regions of the above-described previously-encoded pictures.

More specifically, given an amount Gi_select of generated code and an average quantization step Qp_select_ave for the intra slice region in the selected picture, Xi is computed by "$Xi=Gi\_select \times Qp\_select\_ave$".

Lastly, the quantization step determination unit 24 computes respective amounts Ti and Tp of code allocated to the intra slice region and the non intra slice region in the encoding target picture, and further computes the quantization step for each block by using the allocated amounts of code. This process may be performed by a known method. In order to almost equalize the quantization steps of the intra slice region and the non intra slice region, the allocated amounts of code are computed as follows:

$$Ti=T \times (Xi/(Xi+Xp))$$

$$Tp=T \times (Xp/(Xi+Xp))$$

where T denotes an amount of code allocated to the entire picture. This formula has a known premise (see, for example, Patent-Document 1), and a detailed explanation will be omitted.

Then, an amount of code allocated to each block in the intra slice region is determined based on Ti, an amount of code allocated to each block in the non intra slice region is determined based on Tp, and the quantization step for each block is computed (see step S5).

As described above, in the known technique, when the intra slice region of the encoding target picture has a texture that considerably differs from that of the intra slice region of a picture immediately before the target picture, the accuracy of the estimated complexity index is low. In the present embodiment, similarities for the intra slice between the encoding target picture and a plurality of previously-encoded pictures are computed so as to select a previously-encoded picture utilized to compute the complexity index. Accordingly, encoding information for a previously-encoded intra slice region that has a texture akin to that of the intra slice region in the encoding target picture can be utilized. Therefore, a higher accuracy of the complexity index in comparison with the known method can be obtained, which implements code amount allocation conformed to the property of the intra slice region and higher image quality.

Second Embodiment

Figure 5:
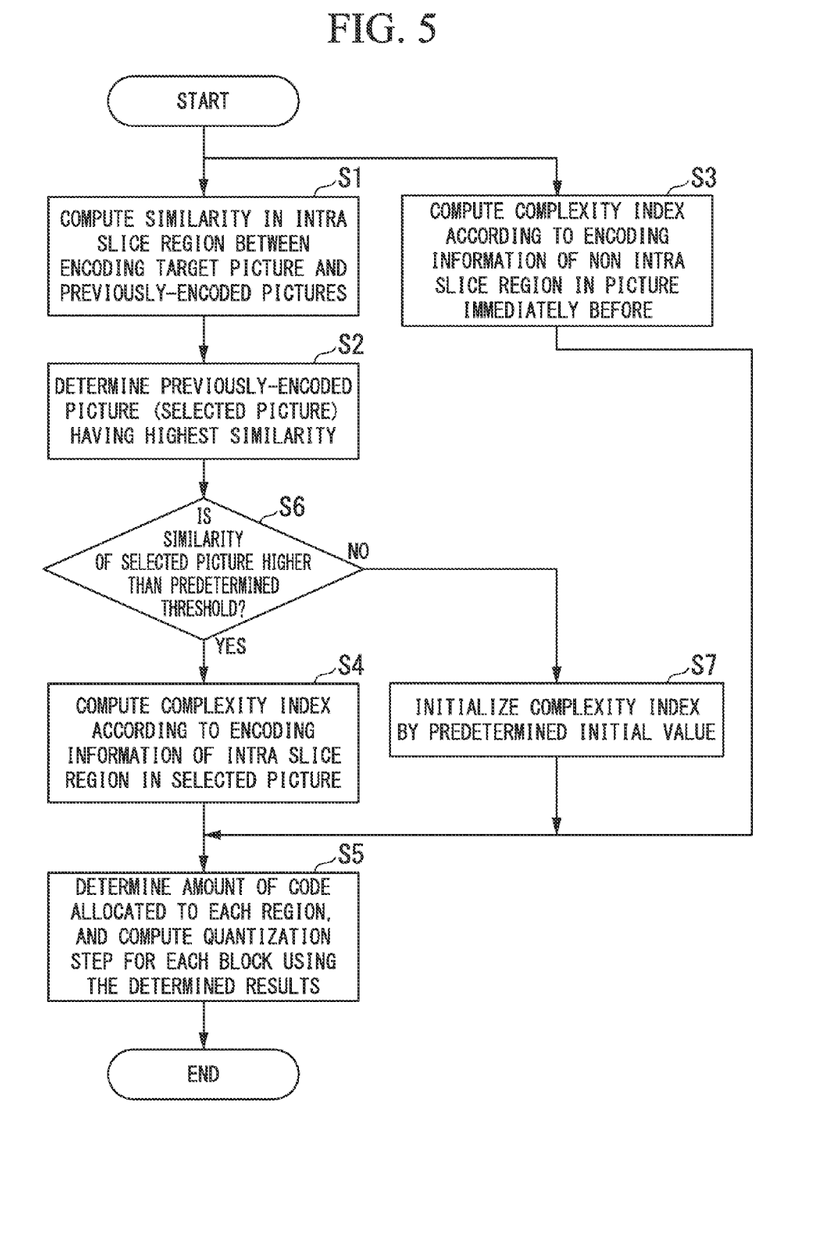
FIG. 5 is a flowchart that shows the operation of the quantization control unit 2 in a second embodiment of the present invention.

Next, referring to FIG. 5, a video encoding apparatus in accordance with a second embodiment of the present invention will be explained. In FIG. 5, steps identical to those in FIG. 3 are given identical reference signs, and explanations thereof are omitted.

Figure 3:
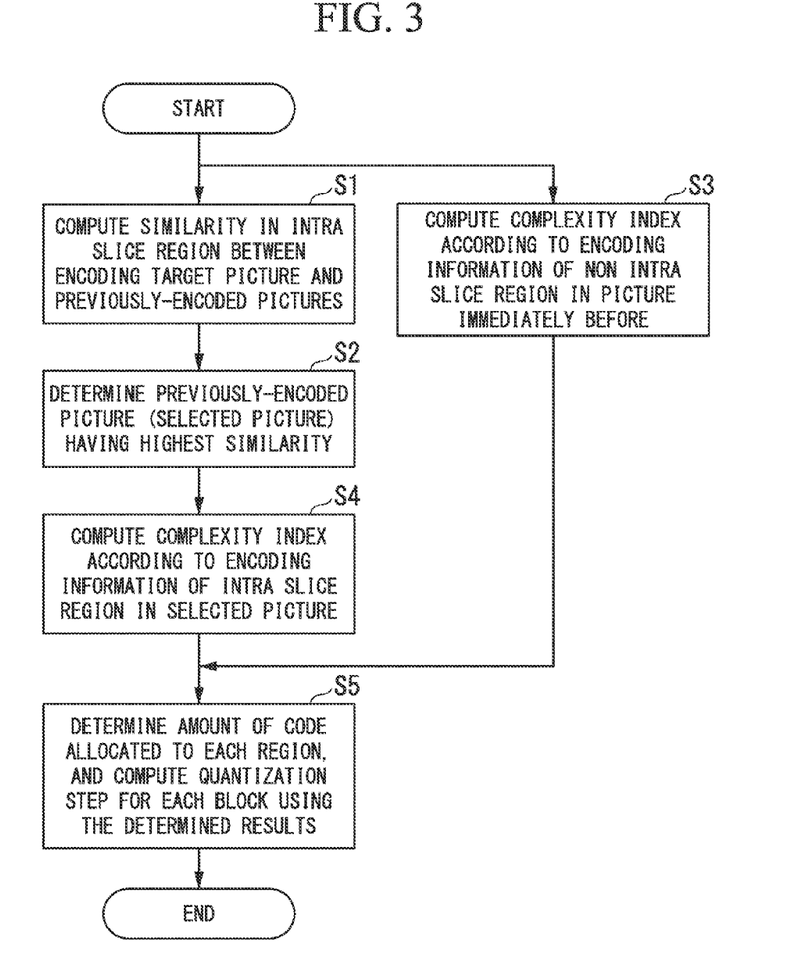
FIG. 3 is a flowchart that shows the operation of the quantization control unit 2 shown in FIG. 2.

In comparison with the operation shown in FIG. 3, the operation shown in FIG. 5 has a distinctive feature of further having steps S6 and S7.

After the picture selection unit 22 determined a selected picture in step S2, the similarity of the selected picture is compared with a predetermined threshold, so as to determine whether or not the similarity is higher than the threshold (see step S6). When the similarity C(i) is SAD as described above, the determination "whether or not the similarity is higher than a predetermined threshold" is actually "whether or not C(i_select) is smaller than a predetermined threshold".

According to the above determination, when the similarity is higher than the threshold, it is regarded that the intra slices of the selected picture and the encoding target picture have a similar image property. Therefore, the index i_select of the selected picture is communicated to the allocated code amount determination unit 23, thereby steps S4 and S5 are executed as in the operation shown in FIG. 3.

If the similarity is lower than or equal to the predetermined threshold, it is determined that the property of the image differs between the intra slice of the selected picture and the intra slice of the encoding target picture, and the picture selection unit 22 supplies null data to the allocated code amount determination unit 23. In this case, the allocated code amount determination unit 23 initializes the complexity index Xi by a predetermined initial value (see step S7).

Any value that provides an average for images having varieties of property can be used as the initial value. An initial value employed in MPEG-2 TM5 is a representative example therefor. MPEG-2 TM5 defines the following initial value for complexity index X applied to one picture:

$$X = (160 * bitrate)/115$$

The above value is subjected to a scaling operation using the ratio of the area of the intra slice to that of the picture. More specifically, since the intra slice period in the present embodiment is six pictures, the complexity index Xi for the intra slice region is computed as follows:

$$Xi = X \times (1/6)$$

If the similarity for the intra slice of the selected picture is extremely low, the intra slices of the selected picture and the encoding target picture have completely different complexities. For example, if the texture of the intra slice in the encoding target picture is extremely complex in comparison with the intra slice of the selected picture, the relevant allocated amount of code is small, which degrades the image quality. Therefore, when the intra slice of the selected picture has a low similarity, the complexity index is initialized using a predetermined initial value, thereby an extreme degradation in the image quality can be prevented.

Third Embodiment

Figure 6:
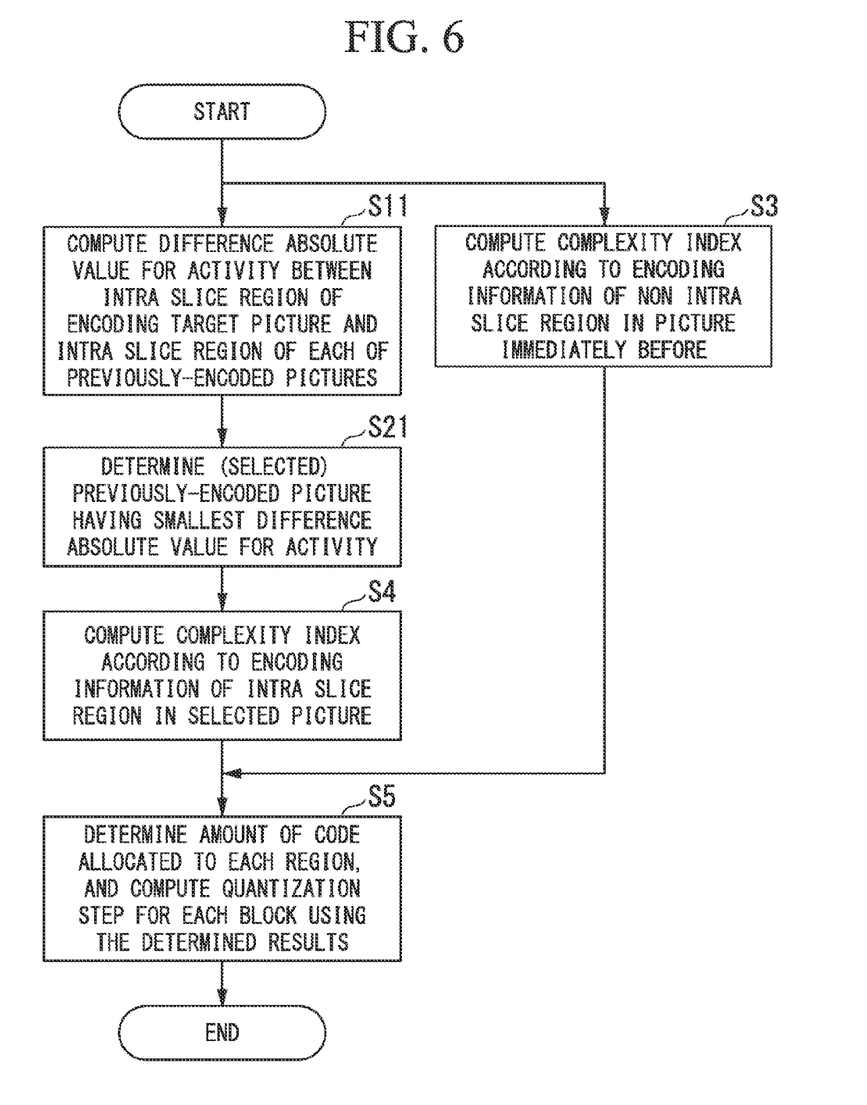
FIG. 6 is a flowchart that shows the operation of the quantization control unit 2 in a third embodiment of the present invention.

Next, referring to FIG. 6, a video encoding apparatus in accordance with a third embodiment of the present invention will be explained. In FIG. 6, steps identical to those in FIG. 3 are given identical reference signs, and explanations thereof are omitted.

In comparison with the operation shown in FIG. 3, the operation shown in FIG. 6 has a distinctive feature of replacing steps S1 and S2 in FIG. 3 with steps S11 and S21 in FIG. 6. In the present embodiment, the similarity computation unit 21 computes the similarity using the above-described activity (measure) of each picture.

Specifically, the total of activity measures (called "total activity") for the blocks in the relevant intra slice is computed, and a difference absolute value between the total activity for the intra slice of the encoding target picture and the total activity for the intra slice of each previously-encoded picture is determined to be a similarity (see step S11).

The activity of each block is computed by dividing the block into four sub-blocks, computing a variance of pixel values in each sub-block, and determining the minimum value in the four variances to be the activity. The difference absolute values for the total activity are communicated to the picture selection unit 22.

The picture selection unit 22 determines a previously-encoded picture, that has the smallest difference absolute value for the total activity, to be the selected picture, and informs the allocated code amount determination unit 23 of the index "i_select" of the selected picture (see step S21).

As the similarity using the activity, the following examples may be used.

Although the above-described example computes the difference absolute value for the total of activity measures of the relevant blocks, the total sum of difference absolute values, each computed between activities in compared blocks, may be determined to be a similarity.

That is it is assumed that act_A(j) and act_B(i) are respective activities of intra slices A and B, j=0, 1, 2, . . . , N−1, j denotes an index for the macroblocks in the relevant intra slice, and N denotes the number of blocks (i.e., macroblocks) in the intra slice. In addition, the blocks j in the intra slices A and B have the same relative position within the intra slice. In this definition, the similarity C is computed by the following formula:

$$C = \sum_{j=0}^{N-1} \lceil act\_A(j) - act\_B(j) \rceil \quad \text{[Formula 1]}$$

Instead of the activity determined for each block, the activity may be computed for each intra slice, and a difference absolute value between the activities of the relevant two intra slices may be determined to be the similarity. The activity for each intra slice is obtained by dividing the intra slice into a plurality of blocks (e.g., four blocks having equal areas), computing a variance of pixel values in each block, and determining the minimum value in the variances of the blocks to be the activity of the relevant intra slice.

As a typical index for similarity, there is a measure that utilize difference determined on a pixel basis, for example, the sum of absolute differences (SAD) between each pair of corresponding pixels in two intra slices. However, this method requires a large amount of computation.

If the relevant two intra slices include the same object, they have similar total values for the activities of the blocks in the ultra slice. Therefore, the difference absolute value for the total of activities for the respective blocks is effectively utilized as a measure for the similarity.

In addition, the activity determined on a block basis is effective for mode determination executed other than the quantization control, and is known as shown in Patent Document 1. That is, when an activity has been computed for mode determination or the like, if the activity is also utilized for the similarity computation in the present invention, the amount of computation can be substantially reduced in comparison with SAD. A typical example will be shown below.

When N is the number of pixels in the intra slice, the amount of computation for SAD between two intra slices for one picture is determined in consideration that the number of times for the product-sum operation is 2N−1 and the number of times for the absolute value computation is N. Here, if it is assumed that the activity on for each block (the size of each block is assumed to be 16×16 pixels) has been computed for the mode determination or the like, the amount of computation required for the difference absolute value for the total of the activities for the blocks in the intra slice of one picture is determined in consideration that the number of times for the product-sum operation is N/256 and the number of times for the absolute value computation is 1.

As described above, when the activity has been computed, the amount of computation can be reduced while securing required image quality, in comparison with a case in which a measure that utilizes the difference on a pixel basis (e.g., SAD) is employed as the similarity.

Fourth Embodiment

Figure 7:
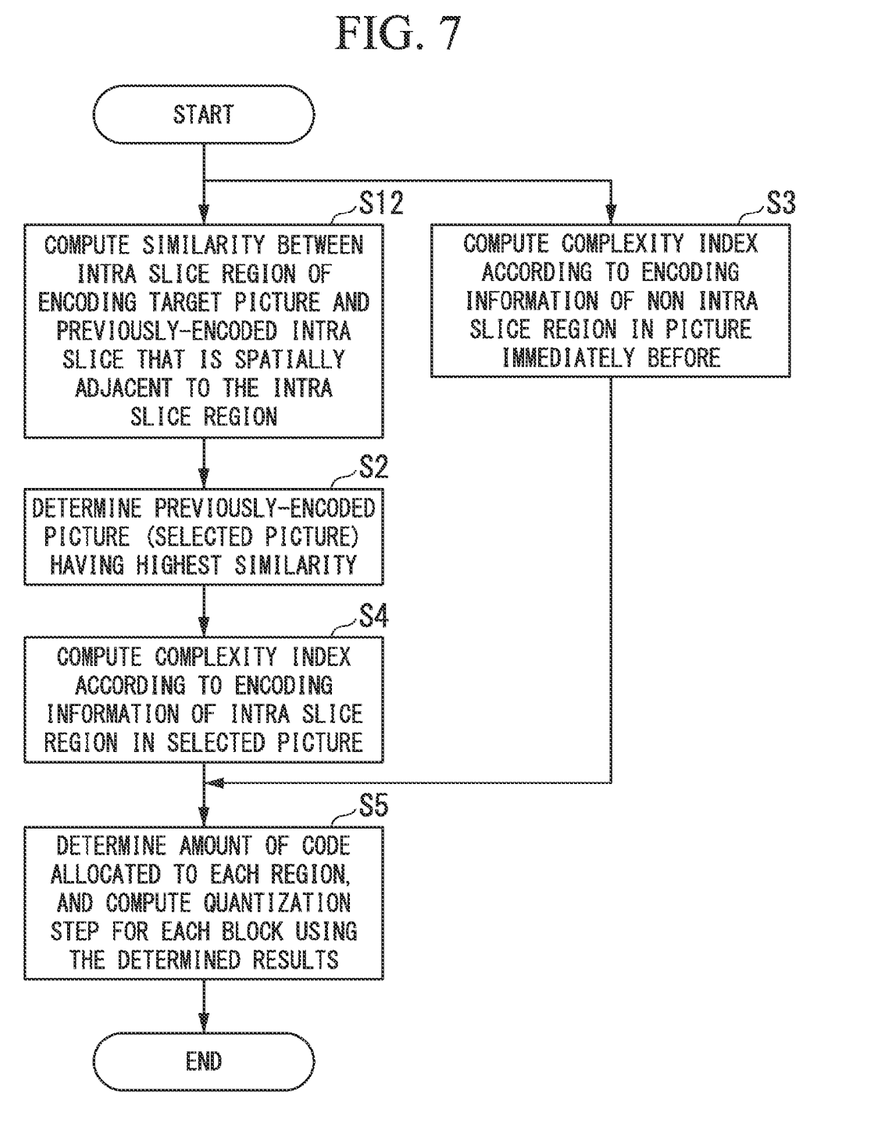
FIG. 7 is a flowchart that shows the operation of the quantization control unit 2 in a fourth embodiment of the present invention.

Next, referring to FIG. 7, a video encoding apparatus in accordance with a fourth embodiment of the present invention will be explained. In FIG. 7, steps identical to those in FIG. 3 are given identical reference signs, and explanations thereof are omitted.

In comparison with the operation shown in FIG. 3, the operation shown in FIG. 7 has a distinctive feature of replacing step S1 in FIG. 3 with step S12 in FIG. 6.

In the present embodiment, among the six previously-encoded pictures, only those having an intra slice adjacent to the intra slice of the encoding target picture are subjected to the similarity computation in the similarity computation unit 21.

In an example of performing such a limitation, a difference absolute value between the coordinate value (on the image plane) of the intra slice in the encoding target picture and the coordinate value (on the image plane) of the intra slice in each previously-encoded picture is computed, and the intra slice of each previously-encoded picture, whose difference absolute value is smaller than or equal to a predetermined value, is defined as an adjacent intra slice. The coordinate value of the intra slice, that is determined on the image plane, may be set to the coordinate value of a midpoint between the left end and the right end of the intra slice in the horizontal direction on the image plane.

Figure 8:
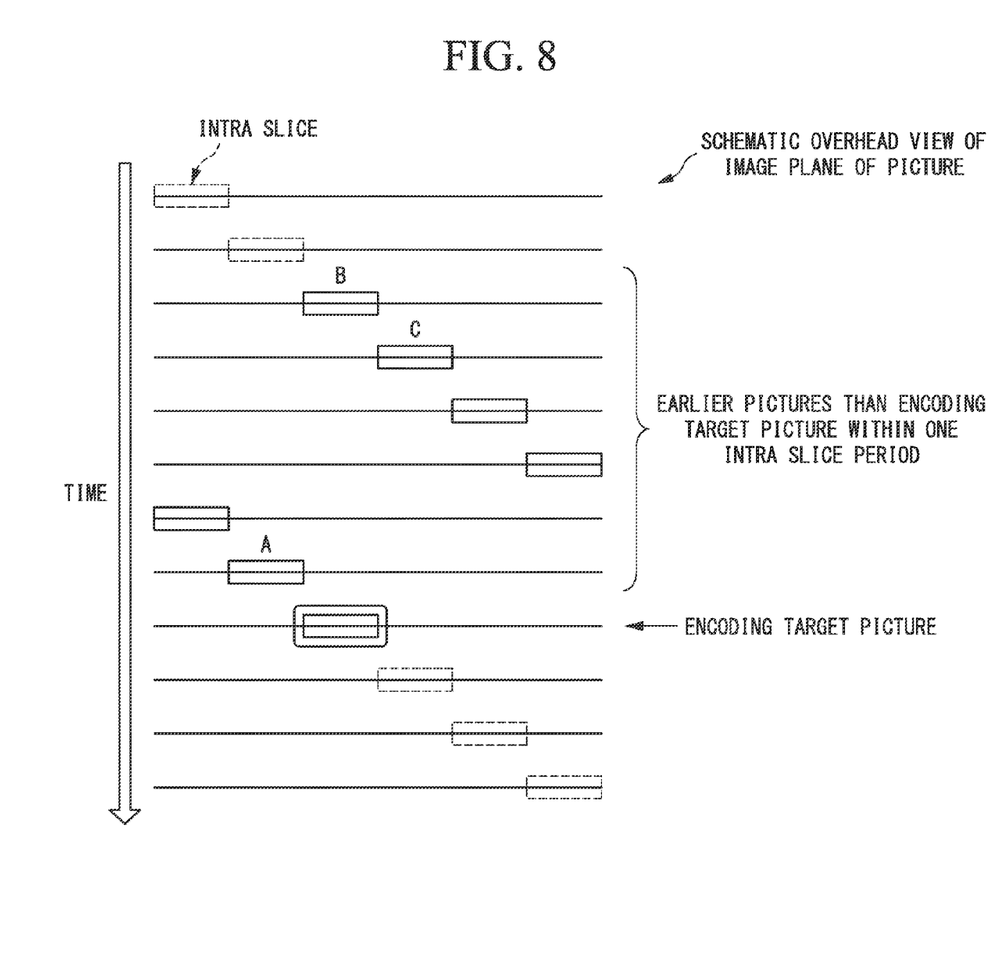
FIG. 8 is a diagram that shows an example of the previously-encoded pictures as candidates in the fourth embodiment.

If the above-described predetermined value for determining adjacent intra slices is set to the width of one intra slice, the intra slices of the previously-encoded pictures as shown in FIG. 8 are selected. That is, the shown example selects a previously-encoded picture immediately before the encoding target picture (i.e., "A" in FIG. 8 having a left-hand neighbor intra slice on the image plane), an earlier picture than the encoding target picture by one intra slice period (i.e., "B" in FIG. 8 having an intra slice at the same position on the image plane), and the next picture to the earlier picture than the encoding target picture by one intra slice period (i.e., "C" in FIG. 8 having a right-hand neighbor intra slice on the image plane).

In the above case, the similarity between the intra slice of the encoding target picture and the intra slice of each selected picture is computed and communicated to the picture selection unit 22 (see step S12).

When there are many past pictures utilized for the similarity computation, the amount of computation increases. However, unlike in the case of sports video, an application (e.g., videophone) that utilizes intra slices generally handles a small amount of motion, and thus the possibility that an object included in the intra slice of the encoding target picture is also included in a previously-encoded intra slice, which is spatially close to the intra slice (of the encoding target picture) on the image plane, is high.

Therefore, in the present embodiment, the similarity computation is applied only to the previously-encoded intra slices whose positions on the image plane are spatially close to the position of the encoding target intra slice. Therefore, it is possible to reduce the amount of computation while securing required image quality.

In a typical example, when the picture rate for input pictures is 30 pictures per second, the intra slice period is 0.5 second, and all past pictures within one intra slice period are subjected to the similarity computation, each of 15 past pictures should be subjected to the similarity computation. By contrast, in an example of the present embodiment, when the similarity computation is limitedly applied to (i) a past picture that has an intra slice at the same position as that of the encoding target picture (i.e., earlier picture by one intra slice period) and (ii) past pictures that have left-hand and right-hand intra slices from that of the encoding target picture, three past pictures are each subjected to the similarity computation, which requires an amount of computation one fifth of that required for the above typical example.

As described above, in order to solve the previously-described problem, when computing the complexity index for the intra slice of the encoding target picture, the present invention computes a similarity between the encoding target picture and each of past previously-encoded pictures, and computes a complexity index for the intra slice of the encoding target picture by utilizing encoding information produced when a previously-encoded picture having the highest similarity (for the intra slice) was encoded.

According to such a method, unlike in the case of conventional methods, when computing the complexity index for the intra slice of the encoding target picture, a previously-encoded intra slice whose property is akin to that of said intra slice can be utilized, so that the image quality can be improved in comparison with the conventional methods.

A program for executing the functions of the units shown in FIG. 2 may be stored in a computer readable storage medium, and the program stored in the storage medium may be loaded and executed on a computer system, so as to perform the quantization control operation.

Here, the computer system has hardware resources which may include an OS and peripheral devices.

The above computer readable storage medium is a storage device, for example, a portable medium such as a flexible disk, a magneto optical disk, a ROM, or a CD-ROM, or a memory device such as a hard disk built in a computer system. The computer readable storage medium also includes a device for temporarily storing the program, such as a volatile memory (RAM) in a computer system which functions as a server or client and receives the program via a network (e.g., the Internet) or a communication line (e.g., a telephone line).

The above program, stored in a memory device or the like of a computer system, may be transmitted via a transmission medium or by using transmitted waves passing through a transmission medium to another computer system. The transmission medium for transmitting the program has a function of transmitting data, and is, for example, a (communication) network such as the Internet or a communication line such (e.g., a telephone line).

In addition, the program may execute a part of the above-explained functions. The program may also be a "differential" program so that the above-described functions can be executed by a combination program of the differential program and an existing program which has already been stored in the relevant computer system.

INDUSTRIAL APPLICABILITY

In video encoding that realizes low delay by employing intra slices, the present invention can be applied to purposes which should inevitably perform quantization control.

REFERENCE SYMBOLS 2 quantization control unit
21 similarity computation unit
22 picture selection unit
23 allocated code amount determination unit
24 quantization step determination unit

The invention claimed is:

1. A quantization control apparatus provided in a video encoding apparatus which utilizes intra slices when an encoding target picture comprises the intra slices and provides an intra slice region in each encoding target picture, wherein the encoding target picture comprises at least one intra slice region and at least one non intra slice region, and the intra slice region is a band whose all blocks are forcibly subjected to intra encoding and the position of the band is moved, per picture, in a longitudinal or lateral direction thereof, and the quantization control apparatus comprises:
 a similarity computation device that computes similarity between the intra slice region of the encoding target picture and the intra slice region of each of previously-encoded pictures, where the similarity is an index determined such that the closer the images of the two different intra slices, the higher the similarity;
 a picture selection device that selects a picture having the highest similarity from among the previously-encoded pictures, based on the similarity computed by the similarity computation device; and
 a quantization step determination device that determines a quantization step used for encoding the encoding target picture, based on complexity for the intra slice region which is computed using encoding information for the intra slice region of the picture selected by the picture selection device and complexity for a non intra slice region which is computed using encoding information for the non intra slice region of a predetermined previously-encoded picture.

2. The quantization control apparatus in accordance with claim 1, further comprising:
 a threshold determination device that determines whether or not the similarity of the picture selected by the picture selection device is higher than a predetermined threshold,
 wherein according to a result of the determination performed by the threshold determination device:
 if the similarity is higher than the predetermined threshold the quantization step determination device executes the above determination of the quantization step used for the relevant encoding; and
 if the similarity is lower than or equal to the predetermined threshold, the quantization step determination device determines the quantization step used for encoding the encoding target picture based on a predetermined initial value, without using the selected picture.

3. The quantization control apparatus in accordance with claim 1, wherein:
 the similarity computation device that computes the similarity based on a difference absolute value for a total of activities for respective blocks of each intra slice.

4. The quantization control apparatus in accordance with claim 1, wherein:
 among the previously-encoded pictures, those which each have an intra slice whose position on an image plane is relatively close to that of the intra slice of the encoding target picture are subjected to the similarity computation by the similarity computation device.

5. A quantization control method of controlling quantization in a quantization control apparatus provided in a video encoding apparatus which utilizes intra slices when an encoding target picture comprises the intra slices and provides an intra slice region in each encoding target picture, wherein the encoding target picture comprises at least one intra slice region and at least one non intra slice region, and the intra slice region is a band whose all blocks are forcibly subjected to intra encoding and the position of the band is moved, per picture, in a longitudinal or lateral direction thereof, and the quantization control method comprises:
 a similarity computation step that computes similarity between the intra slice region of the encoding target picture and the intra slice region of each of previously-encoded pictures, where the similarity is an index determined such that the closer the images of the two different intra slices, the higher the similarity;
 a picture selection step that selects a picture having the highest similarity from among the previously-encoded pictures, based on the similarity computed by the similarity computation step; and
 a quantization step determination step that determines a quantization step used for encoding the encoding target picture, based on complexity for the intra slice region which is computed using encoding information for the intra slice region of the picture selected by the picture selection step and complexity for a non intra slice region which is computed using encoding information for the non intra slice region of a predetermined previously-encoded picture.

6. The quantization control method in accordance with claim 5, further comprising:
 a threshold determination step that determines whether or not the similarity of the picture selected by the picture selection step is higher than a predetermined threshold, wherein according to a result of the determination performed by the threshold determination step:
if the similarity is higher than the predetermined threshold the quantization step determination step executes the above determination of the quantization step used for the relevant encoding; and
if the similarity is lower than or equal to the predetermined threshold, the quantization step determination step determines the quantization step used for encoding the encoding target picture based on a predetermined initial value, without using the selected picture.

7. The quantization control method in accordance with claim 5, wherein:
the similarity computation step that computes the similarity based on a difference absolute value for a total of activities for respective blocks of each intra slice.

8. The quantization control method in accordance with claim 5, wherein:
among the previously-encoded pictures, those which each have an intra slice whose position on an image plane is relatively close to that of the intra slice of the encoding target picture are subjected to the similarity computation by the similarity computation step.

9. A non-transitory computer-readable storage medium that stores a quantization control program operable by a computer provided in a video encoding apparatus which utilizes intra slices when an encoding target picture comprises the intra slices and provides an intra slice region in each encoding target picture, wherein the encoding target picture comprises at least one intra slice region and at least one non intra slice region, and the intra slice region is a band whose all blocks are forcibly subjected to intra encoding and the position of the band is moved, per picture, in a longitudinal or lateral direction thereof, and executes a quantization control operation, the quantization control program causing the computer to perform steps comprising:
a similarity computation step that computes similarity between the intra slice region of the encoding target picture and the intra slice region of each of previously-encoded pictures, where the similarity is an index determined such that the closer the images of the two different intra slices, the higher the similarity;
a picture selection step that selects a picture having the highest similarity from among the previously-encoded pictures, based on the similarity computed by the similarity computation step; and
a quantization step determination step that determines a quantization step used for encoding the encoding target picture, based on complexity for the intra slice region which is computed using encoding information for the intra slice region of the picture selected by the picture selection step and complexity for a non intra slice region which is computed using encoding information for the non intra slice region of a predetermined previously-encoded picture.

10. The quantization control apparatus in accordance with claim 1 wherein:
said predetermined previously-encoded picture is a picture which was encoded immediately before the encoding target picture.

11. The quantization control apparatus in accordance with claim 1, wherein:
the quantization step determination device computes respective amounts of code allocated to the intra slice region and the non intra slice region in the encoding target picture using the complexity for the intra slice region and the complexity for the non intra slice region and determines the quantization step based on said amounts of code.

12. The quantization control method in accordance with claim 5, wherein:
said predetermined previously-encoded picture is a picture which was encoded immediately before the encoding target picture.

13. The quantization control method in accordance with claim 5, wherein:
the quantization step determination step computes respective amounts of code allocated to the intra slice region and the non intra slice region in the encoding target picture using said complexity for the intra slice region and said complexity for the non intra slice region and determines the quantization step based on said amounts of code.

* * * * *